United States Patent [19]

Leinen

[11] Patent Number: 4,784,039

[45] Date of Patent: Nov. 15, 1988

[54] ELECTRIC AND PNEUMATIC VALVE POSITIONER

[75] Inventor: Chris M. Leinen, Houston, Tex.

[73] Assignee: Topworks, Inc., Houston, Tex.

[21] Appl. No.: 26,951

[22] Filed: Mar. 17, 1987

[51] Int. Cl.⁴ ............................................. F15B 13/16
[52] U.S. Cl. ......................................... 91/387; 91/465
[58] Field of Search ................... 91/465, 358 R, 363 R, 91/387; 74/470, 89.14, 89.15, 89

[56] References Cited

U.S. PATENT DOCUMENTS

| | | | |
|---|---|---|---|
| 2,099,244 | 11/1937 | Temple | 74/470 |
| 3,003,475 | 10/1961 | Rouvalis . | |
| 3,087,468 | 4/1963 | Roberts et al. . | |
| 3,095,785 | 7/1963 | Cahill . | |
| 3,313,212 | 4/1967 | Baker et al. . | |
| 3,381,539 | 5/1968 | Ovshinsky | 74/89.14 |
| 3,396,374 | 8/1968 | Barthel et al. | 74/470 X |
| 3,720,487 | 3/1973 | Wiley | 417/572 |
| 3,896,914 | 7/1975 | Konsbruck et al. . | |
| 4,077,738 | 3/1978 | Keely et al. . | |
| 4,106,390 | 8/1978 | Kodaira et al. . | |
| 4,121,618 | 10/1978 | Sweeney . | |
| 4,325,508 | 4/1982 | Kunz | 74/89.15 X |
| 4,358,989 | 11/1982 | Tordenmalm . | |
| 4,475,442 | 10/1984 | Breeden | 91/461 |

OTHER PUBLICATIONS

Conameter Corp. Series 42 Actaire Pneumatic Positioner Data Sheet, 12/84.

Primary Examiner—Edward K. Look
Attorney, Agent, or Firm—Pravel, Gambrell, Hewitt, Kimball & Krieger

[57] ABSTRACT

A control force input system for a balance beam pneumatic valve positioner which does not allow the controlled apparatus to make a full travel motion when the overall control signal is removed. The control force is transmitted to the balance beam or other force summing bar using a motor coupled to a drive unit which compresses or extends a control spring coupled to the balance beam. When the motive power control signal is removed from the motor, the balance beam establishes an equilibrium position based on the existing position of the motor.

24 Claims, 3 Drawing Sheets

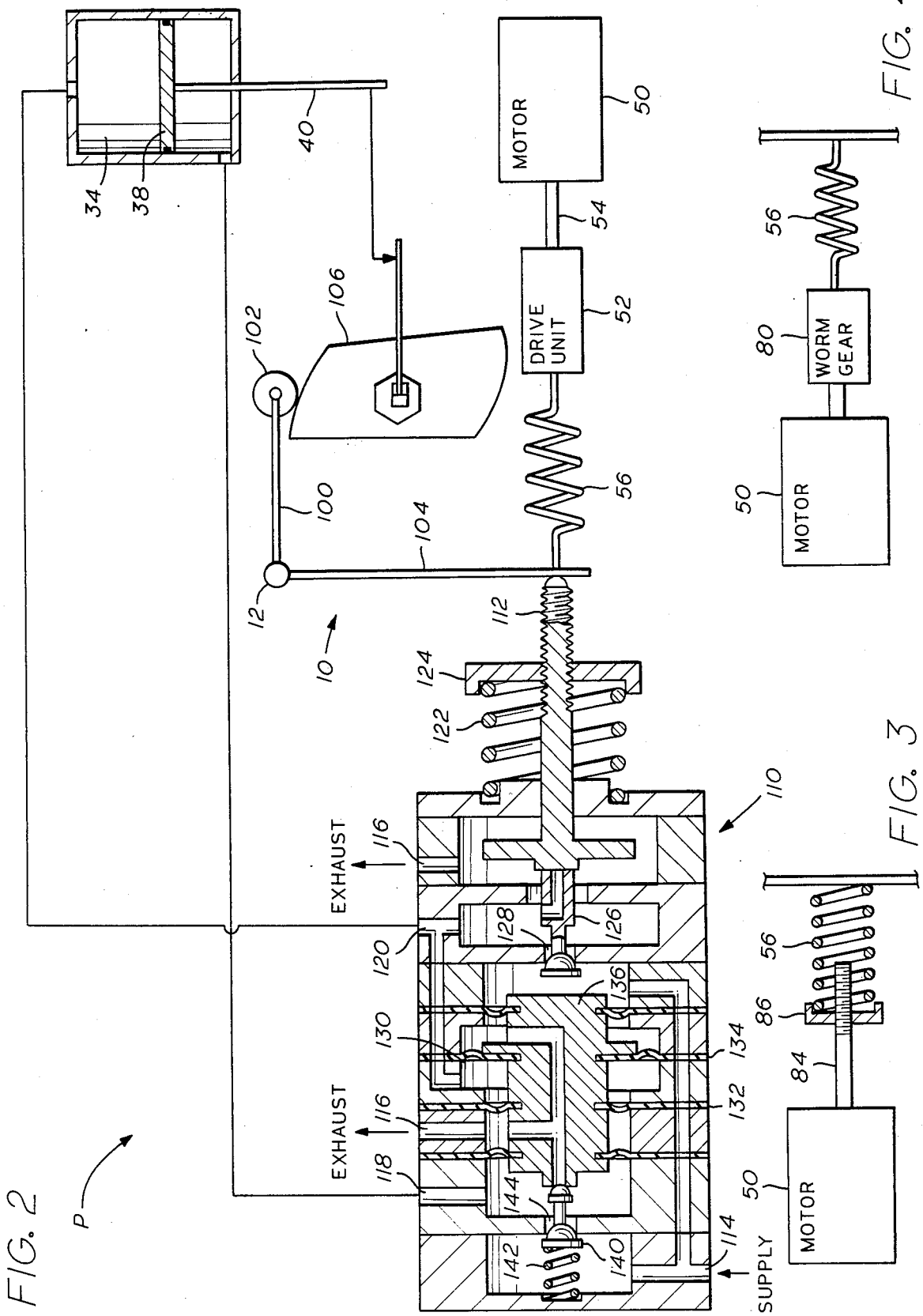

ELECTRIC AND PNEUMATIC VALVE POSITIONER

BACKGROUND OF THE INVENTION

1. Field of the Invention

The present invention relates to an apparatus for actuating a process control element using pneumatic and electrical means.

2. Description of the Prior Art

U.S. Pat. Nos. 3,087,468 and 3,313,212 disclosed pneumatic and magnetic-pneumatic control systems for actuating valves and other apparatus. Both patents utilized pneumatic relays and a balance beam assembly to supply air pressure to a piston located in a cylinder. Unbalancing the beam caused air pressure to be supplied to one side of the piston and removed from the other side of the piston so that the piston moved. The piston was coupled to the balance beam by a spring so that as the piston moved, the balance beam received a force in a counterbalancing direction, forming the feedback necessary to allow the piston to balance at a given location. This movement of the piston and a shaft connected to the piston caused the valve to move as requested by a control input.

The initial imbalance or control signal was provided in U.S. Pat. No. 3,087,468 by a pneumatic bellows assembly appropriately coupled to the beam so that expanding or contracting the bellows caused the balance beam to pivot. The beam became balanced when the piston had moved sufficiently so that the force provided by the spring connected to the piston balanced the force provided by the bellows.

In U.S. Pat. No. 3,313,212 the imbalancing force was provided by a magnetic means using a permanent magnet attached to the balance beam and a coil located near the permanent magnet so that a current in the coil caused a magnetic force between the permanent magnet and the coil. This magnetic force caused the beam to pivot, with balance being restored when the piston spring force balanced the magnetic force being applied.

While the systems performed adequately under ordinary operating conditions, when the control source was removed, in U.S. Pat. No. 3,087,468, when the instrument supply air to the bellows was removed or in U.S. Pat. No. 3,313,212, when the coil current was removed, the actuators caused the piston to travel to full stroke in either the open or closed direction, depending upon configuration and pneumatic connections. This was an undesirable situation because this resulted in reduced control of the system, often when control was critical.

SUMMARY OF THE INVENTION

The present invention provides an apparatus whereby the termination or removal of the control input or signal does not result in the piston making a full travel motion, but causes the piston to remain at the balanced location set prior to the termination of the control signal. In the present invention, the imbalancing or control force is provided by a control spring connected to a drive unit which is in turn driven by a motor, in contrast to the bellows or magnetic couple systems of the prior art. Driving the motor in either direction causes the drive unit to compress or extend the control spring, developing an imbalance in the forces on the balance beam and therefore a change in the piston position due to the operation of the pneumatic relays. Should the power to the motor be removed, the motor stops turning, fixing the control input signal to correspond to that indicated by that position of the motor. Due to inertial effects and frictional effects of the motor and the various drive units that are available, the control unit is fixed in this position so that the piston travels to the balanced position based on the control signal last supplied and not to a full travel position. This means that the valve or other device being actuated is maintained at the position selected prior to termination of the driving signal to the motor, in many cases a more desirable condition than either the fully open or fully closed positions. Such operation thus avoids the problem of completely closing down the fluid flow to an operating system connected therewith, or alternatively supplying excessive fluid flow in the fully open position, either condition of which can be disastrous, especially if the correction is delayed for a substantial period of time. By leaving the system operating at the condition it is in when the malfunction occurs, both of the two extreme conditions are avoided, and normally, there would be no adverse effect under such condition.

BRIEF DESCRIPTION OF THE DRAWINGS

FIG. 2 is a schematic illustration of an alternative valve positioner according to the present invention.

FIG. 3 is a schematic diagram of a motor, drive unit and control spring according to the present invention.

FIG. 4 is an alternate embodiment of a motor, drive unit and control spring according to the present invention.

DESCRIPTION OF THE ALTERNATE EMBODIMENTS

Figure 1:
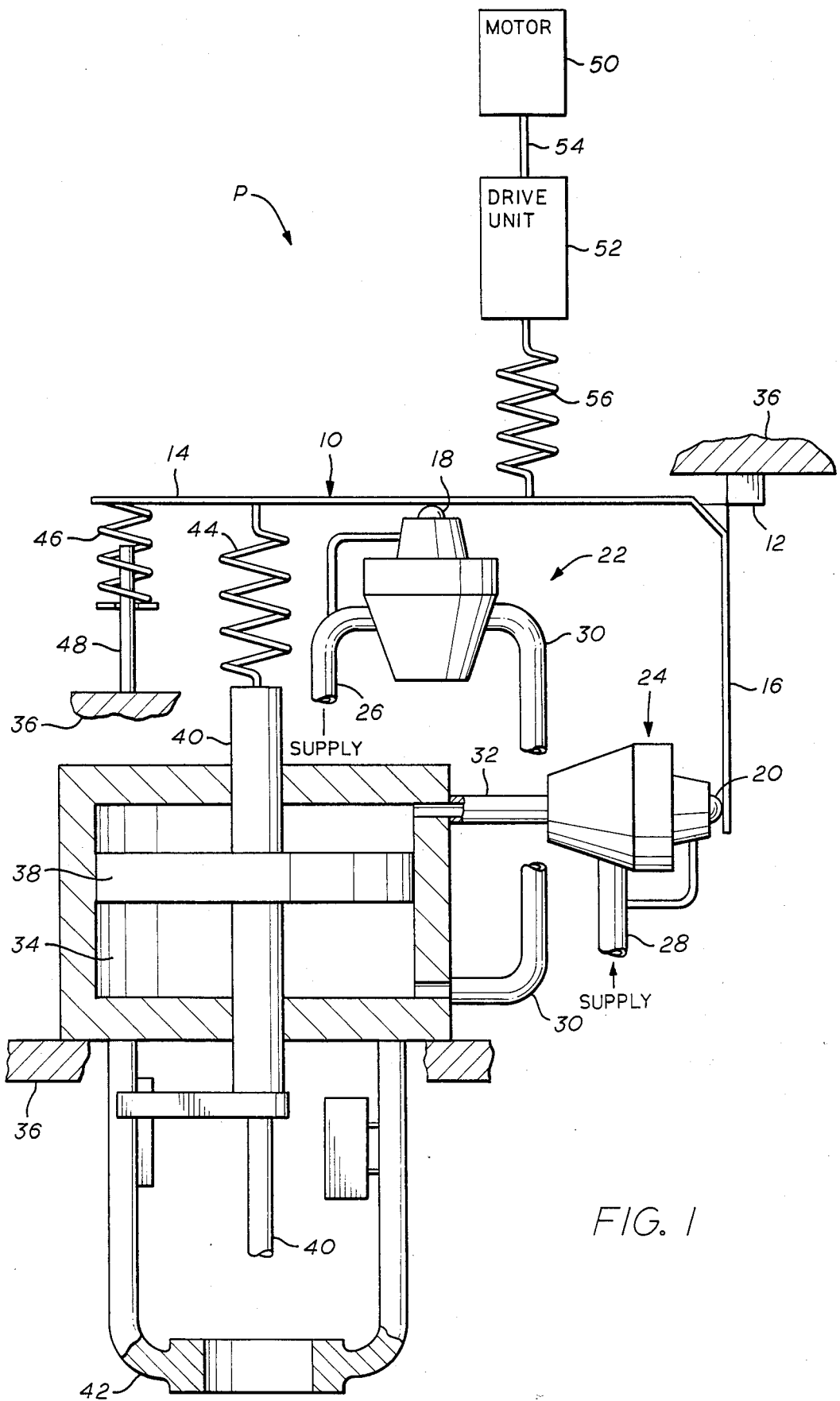
FIG. 1 is a schematic view of a valve positioner according to the present invention.

Referring to FIG. 1, the letter P generally refers to an electrical and pneumatic valve positioner according to the present invention. The positioner P includes a balance beam 10 which pivots at a pivot element 12 and has two arms 14, 16. A pair of pneumatic relays 22, 24 are used in conjunction with the balance beam 10 as the relays used control the air supply used to drive a piston 38 located in a cylinder 34. The piston 38 provides the motion used in actuating the operating device, which is commonly a valve.

The pneumatic relays 22, 24 receive a supply of air through supply ports 26, 28. The pneumatic relays 22, 24 have nozzles 18, 20 which contact the balance beam 10 to control the supply of air to the cylinder 34. The relays 22, 24 have an output port 30, 32 which can be connected either to the pneumatic supply 26, 28 or to a vent port depending upon the position of the balance beam 10 in relation to the nozzles 18, 20. The relays are connected to two ports of the cylinder 34, one relay 22 having its output port 30 connected below the piston 38 and the other relay 24 having its output port 32 connected above the piston 38.

In one preferred embodiment, if the balance beam 10 were to be located away from the nozzle IB of pneumatic relay 22, the output port 30 would be connected to the vent. The location of the other relay 24 is such that under these conditions its nozzle 20 would be closed by the balance beam arm 16 and the air supply 28 would be connected to the output port 32. In this way the piston travels downwardly in the cylinder 34 because of a positive pressure above the piston 38 and a vent connection below the piston 38. A shaft 40 connected to the piston 38 causes the attached valve or other mechanism to travel. This travel of the piston 38 and the shaft 40 is fed back to the balance beam 10 by means of a range spring 44 connected to the shaft 40. As the piston 38 travels downwardly, the range spring 44 is extended and therefore exerts a force on the balance beam causing the balance beam arm 14 to approach the relay nozzle 18 and the balance beam arm 16 to move away from the nozzle 20 of the other relay 24. As the nozzle 18 is closed off, and the other nozzle 20 is opened up, the venting of the output port 30 ceases, the pressure supply to output port 32 stops, and the piston 38 stops traveling.

A zero set condition, wherein the piston 38 is aligned in the cylinder 34 at the desired zero reference position, is established using a zero spring 46 attached to a shaft 48 which is in turn attached to the fixed structure 36 of the positioner P. Appropriately adjusting the zero spring 46 on the shaft 48 sets the zero position of the piston 38 as desired, generally at a central position.

When the system is in equilibrium at a given position, a control input is used to cause the piston 38 to move as desired. The control input is provided by the combination of a motor 50, preferably electric, which is connected via a shaft 54 to a drive unit 52 which in turn is connected to a control spring 56. The control spring 56 is attached to the balance beam 10 to complete the linkage used to provide the control input. When the motor 50 is energized, the drive unit 52 is activated to compress or extend the control spring 56, thus applying a force to the balance beam 10 to upset the equilibrium and causing the piston 38 to move in the desired direction. Energizing the motor 50 causes it to rotate, which in turn moves the piston 38 and the controlled apparatus. The motor 50 can be any type of motor which allows reversible motion so that the control spring 56 can be compressed or extended. Thus the motor 50 can be electrically or pneumatically operated.

Feedback can be used to control the energization and rotational direction of the motor 50. This feedback can be any type desired or necessary for proper operation of the controlled apparatus with respect to a larger system environment, and will be obvious to those skilled in the art.

The drive unit 52 can be any suitable drive unit which provides a rotary to linear conversion in the case of a helical control spring 56 or suitable conversion when used with other bias means. One preferred embodiment of the drive unit 52 is a worm gear 80 (FIG. 4). A worm gear mechanism has the characteristic that it cannot be driven by the output shaft. This means that the control spring 56 cannot drive the worm gear 80 or the motor 50, thereby fixing the position of the control spring 56 with respect to the drive unit 52 at the location existing when power is removed from the motor 50.

An alternate preferred embodiment of the drive unit 52 is shown in FIG. 3. This embodiment employs a threaded shaft 84 and a nut 86 located on the shaft 84. The nut 86 is affixed to the control spring 56 so that when the motor 50 is activated the shaft 84 turns but the nut 86 does not rotate, thereby driving the nut 86 linearly along the shaft 84. This linear motion of the nut 86 results in the control spring being compressed or extended as desired. Should the power be removed from the motor 50 in this situation, the tension on control spring 50 does not change because of the inertial resistance of the motor 50 and the relatively high friction resistance of the nut 86 on the shaft 84.

An alternate embodiment of the valve positioner P is shown in FIG. 2. In this embodiment a motor 50, drive unit 52 and control spring 56 are connected to a balance beam 10 to provide the control force and control input. The balance beam 10 has two arms, a first arm 100 which has a wheel 102 mounted at one end. The other arm 104 of the balance beam 10 is flexible and is described as a cantilever range spring. This arm 104 therefore replaces both the arm 14 and the range spring 44 of the embodiment shown in FIG. 1. The wheel 102 tracks a cam 106 which is coupled to the piston shaft 40. The cam 106 allows the positional input of the piston 38 to be fed back to the balance beam 10 using various ratios, either linear or accelerated ratios as desired, for adjusting the sensitivity of the positioner P.

A relay block 110 is coupled to the cantilever range spring 104 by means of a follower 112. The relay block 110 is supplied with air pressure to the supply port 114 and has exhaust ports 116 and output ports 118 and 120. The output ports 118, 120 are connected to the upper and lower portions of a cylinder 34 as desired for direct action or reverse action of the positioner P. A zero set spring 122 and a zero set nut 124 are provided to adjust the zero position of the piston 38.

Operation of the positioner P shown in FIG. 2 is as follows. The motor 50 is energized so that the control spring 56 is compressed. This causes the follower 112 to move a direct pilot valve 126 so that a direct pilot port 128 is opened, allowing pressure to be transmitted from the supply port 114 to the outlet port 120. This pressure supplied to the outlet port 120 in turn pressurizes a central chamber 130 located between two diaphragms 132 and 134. The pressure in the central chamber 130 moves a reverse pilot control block 136 away from a reverse pilot valve 140. This movement of the control block 136 connects the outlet port 118 to the exhaust port 116, reducing pressure on the opposite side of the piston 38 so that the piston 38 can travel. The travel of the piston 38 causes the shaft 40 to move, which in turn is coupled to the cam 106, which moves the balance beam 10 until an equilibrium condition is met and the piston 38 is in the desired location.

If the piston 38 is desired to be moved in the opposite direction from the previous example, the motor 50 is energized and the range spring 56 is extended so that the balance beam 10 is moved away from the follower 112. This movement of the balance beam 10 causes the follower 112 to move away from the direct pilot valve 126 which in turn couples the outlet port 120 to the exhaust port 116 so that a portion of the cylinder 34 is being vented. The exhaust port 116 is also coupled to the central chamber 130 so that a reduced pressure appears in the central chamber 130. This reduced pressure causes the reverse pilot control block 136 to exert a force on the reverse pilot valve 140 and compress a reverse pilot spring 142. The movement of the reverse pilot valve 140 opens a reverse pilot port 144, thereby allowing the air supply port 114 to be connected to the outlet port 118. In this way, supply pressure is connected to the opposite side of the piston 38 and the piston 38 therefore travels inside the cylinder 34. This travel of the piston 38 continues until the balance beam 10 establishes an equilibrium condition.

Figure 5:
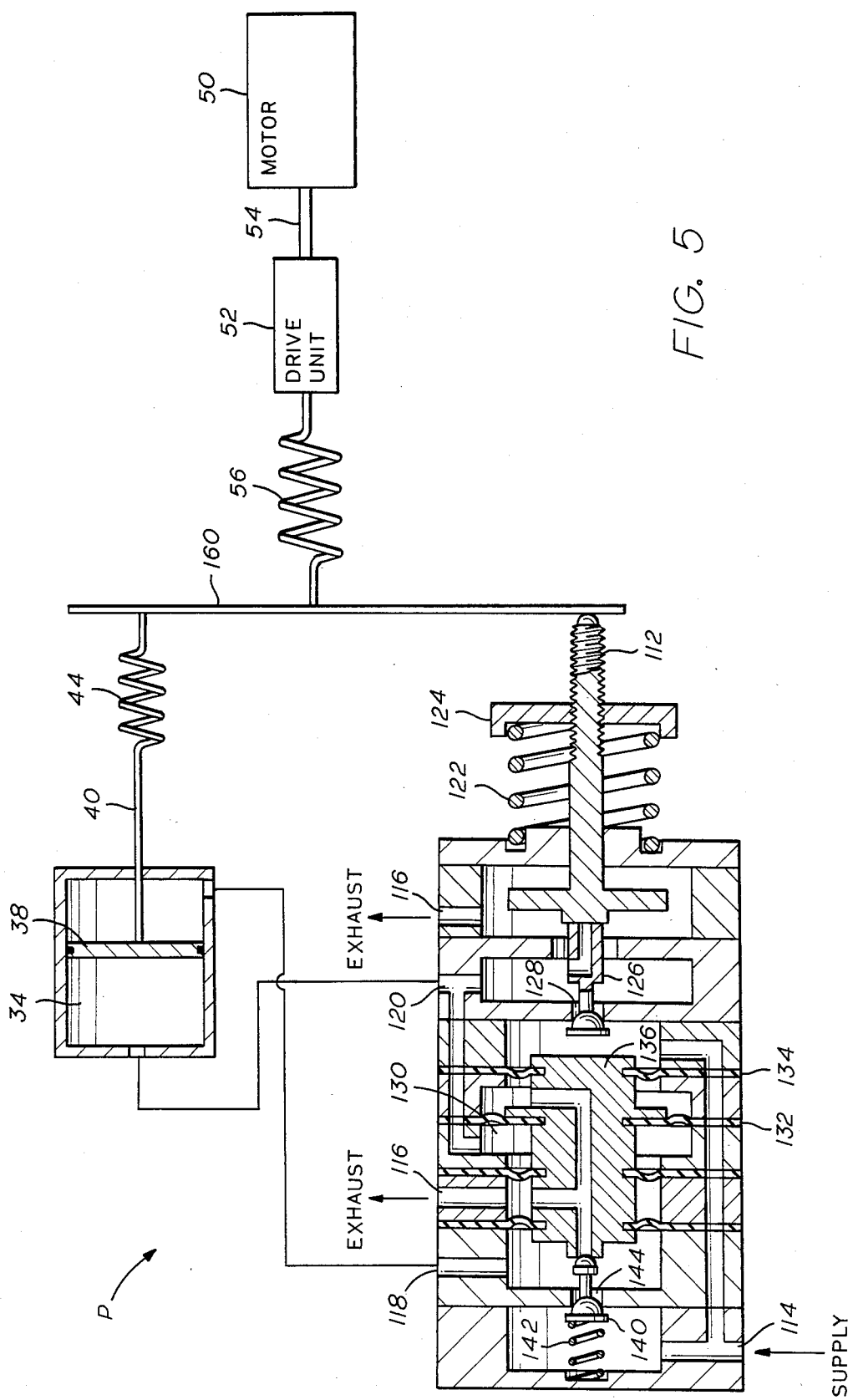
FIG. 5 is a schematic illustration of an alternative positioner according to the present invention.

Another alternate embodiment of the positioner P is shown in FIG. 5. In this embodiment the balance beam 10 has been replaced by a sliding bar 160. The sliding bar 160 freely slides transversely but does not pivot, so that the sliding bar 160 is a summing junction for the forces supplied by the range spring 44, the control spring 56 and the zero set spring 22. As the control spring 56 is extended, the bar 160 moves away from the follower 112 causing the outlet port 120 to be coupled to the exhaust 116 and the other outlet port 118 to be coupled to the pneumatic supply 114, in a fashion similar to that of the embodiment shown in FIG. 2. This connection of the outlet ports 118, 120 causes the piston 38 to travel to extend the range spring 44. The piston 38 travels until the forces supplied by the various springs are balanced and the positioner P is in an equilibrium position.

It can be seen that should power to the motor 50 be removed, in any embodiment, the positioner P would only reach the equilibrium point which was established by the motor 50 prior to its deenergization. In so doing, if the motor 50 were to be lose its power source, the control signal, the piston 38 would not travel to a full travel position in the cylinder 34, but would remain at the equilibrium condition set by the position of the motor 50 as transformed by the drive unit 52.

This characteristic of remaining at the current position is more desirable in many control situations because this eliminates the addition of an additional error signal into the environment and thereby lessens the required responses. Maintaining the valve positioner at its current position also allows a partially operational condition to occur. For example, if the valve positioner is operating a valve on a gas pipeline spur which feeds a city and the positioner loses the control signal, a full travel condition would either shut off the gas to the city, or increase the flow to the city, thereby disrupting overall pressure and flow conditions on the pipeline. By remaining in the current position, the valve positioner of the present invention prevents either of these developments and keeps gas flow and pressure at the rate previously used, resulting in fewer problems for both the city and the pipeline operators.

Alternate embodiments of the positioner P of the present invention can be used with piston and spring actuator assemblies, vane actuators, pneumatic motors, or other actuators as appreciated by those skilled in the art.

An embodiment of the positioner P used in conjunction with a piston and spring actuator has only a single outlet port which is coupled to the pneumatic portion of the cylinder. Pneumatic pressure is applied to only one side of the piston in the cylinder, with the spring providing the opposing force. By coupling the output port of a pneumatic supply the pressure in the cylinder increases, moving the piston against the resisting force of the spring. When the output port is coupled to a vent, the pressure in the cylinder is reduced and the piston is moved by the spring.

An embodiment of the positioner P used in conjunction with a vane actuator is similar to the above piston in cylinder examples, except that the vane pivots instead of the piston traveling in cylinder. The vane is appropriately coupled to the positioner P to provide positional information.

An embodiment of the positioner P utilized with a pneumatic motor has two outlet ports, each connectable to a pneumatic supply The pneumatic motor inlet ports to allow the motor to rotate in two directions. Coupling the appropriate positioner outlet port to the motor causes the motor to rotate. The rotation of the motor is coupled to the positioner P by appropriate bias or force application means as necessary to indicate the position of the motor.

The foregoing disclosure and description of the invention are illustrative and explanatory thereof, and various changes in the size, shape and materials as well as in the details of the illustrated construction may be made without departing from the spirit of the invention, all such changes being contemplated to fall within the scope of the appended claims.

I claim:

1. A control element positioning apparatus activated by an external control signal, comprising:
   a balance beam, said balance beam being coupled to a pivot element;
   a pair of pneumatic force balance elements each having an air nozzle, the nozzle of each force balance element being disposed adjacent to said balance beam and positioned whereby movement of said balance beam towards one nozzle moves said balance beam away from the other nozzle, each of said force balance elements having a pneumatic output port;
   a cylinder, said cylinder having a piston disposed therein, said piston being coupled to a shaft;
   each of said pneumatic output ports being coupled to an end of said cylinder;
   a range spring coupled between said shaft and said balance beam;
   a control spring having two ends, the first end coupled to said balance beam;
   a drive unit having an input and an output, the output coupled to the second end of said control spring; and
   a motor having a shaft coupled to the input of said drive unit and whose motion is controlled by the external control signal.

2. The apparatus of claim 1, further comprising:
   a zero spring coupled to said balance beam for allowing a zero reference equilibrium position to be established.

3. The apparatus of claim 1, wherein said drive unit includes a worm gear mechanism.

4. The apparatus of claim 1, wherein said drive unit includes:
   a threaded shaft coupled to said motor shaft and;
   a nut threaded onto said threaded shaft and coupled to said control spring, so that when said threaded shaft rotates, said nut remains rotationally fixed.

5. The apparatus of claim 1, wherein the motor is an electric motor and the external control signal is the supply of electrical energy to the motor.

6. A control element positioning apparatus for positioning a piston in a cylinder, the cylinder having inlet ports at both ends and the piston being coupled to a shaft and the apparatus being coupled to a pneumatic supply and an exhaust and being activated by an external control signal, comprising:
   a balance beam, said balance being coupled to a pivot element and said balance beam being coupled to the shaft;
   a pneumatic force balance element having pneumatic output ports and being coupled to said balance beam so that when said balance beam moves in a first direction a first pneumatic output port is coupled to a pneumatic supply and a second pneumatic output port is coupled to an exhaust and when said balance beam moves in a second direction, the first pneumatic output port is coupled to an exhaust and the second pneumatic output port is coupled to a pneumatic supply;

each of said pneumatic output ports being adapted to be coupled to an end of the cylinder;

a control spring having two ends, the first end coupled to said balance beam;

a drive unit having an input and an output, the output being coupled to the second end of said control spring; and a motor having a shaft coupled to the input of said drive unit and whose motion is controlled by the external control signal.

7. The apparatus of claim 6, further comprising:
a range spring for providing a force indicative of the position of the piston in the cylinder, said range spring coupling said balance beam to the shaft.

8. The apparatus of claim 6, wherein said balance beam includes a range spring for providing a force indicative of the position of the piston on the cylinder.

9. The apparatus of claim 8, further comprising: a zero spring coupled to said balance beam for allowing a zero reference equilibrium position to be established.

10. The apparatus of claim 6, wherein said drive unit is adapted to provide a rotary to linear conversion.

11. The apparatus of claim 6, wherein said drive unit includes a worm gear mechanism.

12. The apparatus of claim 6, wherein said drive unit includes:
a threaded shaft coupled to said motor shaft and;
a nut threaded onto said threaded shaft and coupled to said control spring so that when said threaded shaft rotates, said nut remains rotationally fixed.

13. The apparatus of claim 6, wherein said motor is an electric motor and the external control signal is the supply of electrical energy to the motor.

14. A positioning apparatus for positioning an actuator; the actuator being adapted to move bidirectionally, being responsive to pneumatic pressures and providing means for indicating the position of the actuator; and the apparatus being coupled to a pneumatic pressure source and a pneumatic pressure vent and being activated by an external control signal, comprising:
means for summing a plurality of applied forces and being adapted for motion in response to an imbalance of the applied forces;
actuator bias means for providing a force indicative of the actuator position; said actuator bias means being coupled to the actuator position indication means and coupled to said summing means;
control bias means for providing a force indicative of the desired actuator position, said control bias means being coupled to said summing means and having an input for receiving a positional signal;
drive means for providing a positional signal to said control bias means responsive to an input signal, said drive means having an input and an output, the output being coupled to said control bias means positional input;
a motor having a shaft for providing a positional signal indicative of the desired actuator position and whose motion is controlled by the external control signal, said motor shaft being coupled to said drive means input; and pneumatic pressure control means for coupling the pneumatic pressure source and the pneumatic pressure vent to the actuator, said pressure control means being coupled to said summing means, to the actuator, to the pneumatic pressure source and to the pneumatic pressure vent, so that when said summing means moves in a first direction the pneumatic pressure source and the pneumatic pressure vent are coupled to the actuator to cause the actuator to move in one direction and when the summing means moves in a second direction the pneumatic pressure source and the pneumatic pressure vent are coupled to the actuator to cause the actuator to move in an opposite direction.

15. The apparatus of claim 14, further comprising:
zero set bias means for providing a force to set the equilibrium position of said summing means at a selected actuator position, said zero set bias means being coupled to said summing means.

16. The apparatus of claim 14, wherein said summing means includes a balance beam.

17. The apparatus of claim 16, wherein said pneumatic pressure control means includes first and second pneumatic output means adapted so that when said first output means is coupled to the pneumatic pressure source, said second output means is coupled to the pneumatic pressure vent and when said first output means is coupled to the pneumatic pressure vent, said second output means is coupled to the pneumatic pressure source.

18. The apparatus of claim 16, wherein said balance beam has two arms and said actuator bias means includes one of said balance beam arms.

19. The apparatus of claim 18, further comprising:
zero set bias means for providing a force to set the equilibrium position of said summing means at a selected actuator position, said zero set bias means being coupled to said summing means.

20. The apparatus of claim 14, wherein said motor is an electric motor and the external control signal is the supply of electrical energy to said motor.

21. The apparatus of claim 14, wherein said drive means is adapted to provide a rotary motion to linear motion conversion.

22. The apparatus of claim 21, wherein said drive means includes a worm gear mechanism.

23. The apparatus of claim 21, wherein said drive means includes:
a threaded shaft coupled to said motor shaft; and
a nut threaded onto said threaded shaft and coupled to said control bias means so that when said threaded shaft rotates, said nut remains rotationally fixed.

24. The apparatus of claim 14, wherein said pneumatic pressure control means includes first and second pneumatic output means adapted so that when said first output means is coupled to the pneumatic pressure source, said second output means is coupled to the pneumatic pressure vent and when said first output means is coupled to the pneumatic pressure vent, said second output means is coupled to the pneumatic pressure source.

* * * * *